US011210755B2

United States Patent
Mitsumaki et al.

(10) Patent No.: US 11,210,755 B2
(45) Date of Patent: Dec. 28, 2021

(54) INFORMATION RETRIEVAL SERVER, INFORMATION RETRIEVAL SYSTEM AND INFORMATION RETRIEVAL METHOD

(71) Applicant: Toyota Jidosha Kabushiki Kaisha, Toyota Aichi-ken (JP)

(72) Inventors: Koichiro Mitsumaki, Nagoya Aichi-ken (JP); Masato Endo, Nagakute Aichi-ken (JP); Ryota Kondo, Nagoya Aichi-ken (JP); Yasuhisa Obata, Nagoya Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 310 days.

(21) Appl. No.: 16/369,851

(22) Filed: Mar. 29, 2019

(65) Prior Publication Data

US 2019/0304045 A1 Oct. 3, 2019

(30) Foreign Application Priority Data

Apr. 2, 2018 (JP) .............................. JP2018-070844

(51) Int. Cl.
*G06Q 30/00* (2012.01)
*G06Q 50/30* (2012.01)
(Continued)

(52) U.S. Cl.
CPC .............. *G06Q 50/30* (2013.01); *G06Q 10/02* (2013.01); *H04L 67/1097* (2013.01); *H04L 67/16* (2013.01)

(58) Field of Classification Search
CPC ..... H04L 67/16; H04L 67/1097; G06Q 50/30; G06Q 10/02; G06Q 30/0645
(Continued)

(56) References Cited

U.S. PATENT DOCUMENTS 10,304,027 B1 * 5/2019 Haque .................... G06Q 50/30
10,467,551 B2 * 11/2019 Gayton .................. G01C 21/00
(Continued)

FOREIGN PATENT DOCUMENTS

JP 2002-342891 A 11/2002
JP 2003-091669 A 3/2003
(Continued)

OTHER PUBLICATIONS

U.S. Appl. No. 16/183,976, filed Nov. 8, 2018.

*Primary Examiner* — Quang N Nguyen
(74) *Attorney, Agent, or Firm* — Dinsmore & Shohl LLP

(57) ABSTRACT

An information retrieval server includes a communication device and a processing device. The communication device communicates with servers of a plurality of business operators and a communication terminal of a user through a communication network, each of the plurality of business operators performing a car sharing service. The processing device presents information relevant to vehicles held by the plurality of business operators, to the user, acquires information input from the communication terminal, the information being information about a predetermined item included in a use condition for the car sharing service, causes the servers of the plurality of business operators to retrieve a vehicle satisfying a use condition determined by the acquired information, from the held vehicles, and sends information relevant to the retrieved vehicle, to the communication terminal.

9 Claims, 17 Drawing Sheets

(51) Int. Cl.
   *H04L 29/08*     (2006.01)
   *G06Q 10/02*     (2012.01)
(58) Field of Classification Search
   USPC .......................................................... 705/13
   See application file for complete search history.

(56) References Cited

U.S. PATENT DOCUMENTS

| | | | | |
|---|---|---|---|---|
| 10,540,330 | B1* | 1/2020 | Tiwari | H04L 65/60 |
| 2005/0273781 | A1* | 12/2005 | Nakamura | H04L 67/34 |
| | | | | 717/178 |
| 2010/0293224 | A1* | 11/2010 | Moriwaki | G06F 16/29 |
| | | | | 709/203 |
| 2013/0318241 | A1* | 11/2013 | Acharya | H04L 67/16 |
| | | | | 709/226 |
| 2014/0333963 | A1* | 11/2014 | Nakamura | H04L 67/16 |
| | | | | 358/1.15 |
| 2015/0288779 | A1* | 10/2015 | Okumura | H04W 4/80 |
| | | | | 709/219 |
| 2015/0296031 | A1* | 10/2015 | Miyazaki | G06F 16/95 |
| | | | | 709/204 |
| 2016/0004981 | A1* | 1/2016 | Wang | G06Q 10/1095 |
| | | | | 705/6 |
| 2018/0018591 | A1* | 1/2018 | Shiraishi | H04L 67/12 |
| 2019/0122469 | A1* | 4/2019 | Fujiwara | G07C 9/00309 |
| 2019/0259227 | A1* | 8/2019 | Oesterling | G06Q 30/0645 |
| 2020/0070715 | A1* | 3/2020 | Krause | B60R 25/20 |
| 2020/0156663 | A1* | 5/2020 | Alvarez | G01C 21/3691 |
| 2020/0258010 | A1* | 8/2020 | Schlank | G06Q 10/1093 |
| 2020/0335098 | A1 | 10/2020 | Saito | |
| 2021/0056477 | A1* | 2/2021 | Ahire | G06Q 10/0635 |
| 2021/0133908 | A1* | 5/2021 | Loflin | G01C 21/3438 |

FOREIGN PATENT DOCUMENTS

| | | |
|---|---|---|
| JP | 2011-209960 A | 10/2011 |
| JP | 2017-102553 A | 6/2017 |
| WO | 2018/043113 A1 | 3/2018 |

* cited by examiner

FIG. 2

VEHICLE INFORMATION (BUSINESS OPERATOR A) 700A

| VEHICLE ID | DISPOSITION AREA | VEHICLE TYPE | RIDING CAPACITY | PRICE RANGE TYPE | DROP-OFF | AVAILABLE OPTION |
|---|---|---|---|---|---|---|
| A001 | FIRST AREA | SMALL SIZE | 4 | V1 | OK | STUDLESS |
| A002 | SECOND AREA | MEDIUM SIZE | 5 | V2 | OK | STUDLESS |
| A003 | SECOND AREA | MEDIUM SIZE | 5 | V2 | OK | — |
| ... | ... | ... | ... | ... | ... | ... |

FIG. 3

RESERVATION INFORMATION (BUSINESS OPERATOR A) 800A

| VEHICLE ID | 0:00-1:00 | 1:00-2:00 | 2:00-3:00 | ... | 23:00-24:00 |
|---|---|---|---|---|---|
| A001 | ○ | — | — | ... | ○ |
| A002 | ○ | ○ | ○ | ... | ○ |
| A003 | — | — | — | ... | ○ |
| ⋮ | ⋮ | ⋮ | ⋮ | ⋮ | ⋮ |

FIG. 4

VEHICLE INFORMATION (BUSINESS OPERATOR B) ~700B

| VEHICLE ID | DISPOSITION AREA | VEHICLE TYPE | RIDING CAPACITY | PRICE RANGE TYPE | DROP-OFF | AVAILABLE OPTION |
|---|---|---|---|---|---|---|
| B001 | FIRST AREA | SMALL SIZE | 4 | V2 | OK | — |
| B002 | SECOND AREA | MEDIUM SIZE | 5 | V3 | OK | STUDLESS |
| B003 | THIRD AREA | LARGE SIZE | 7 | V4 | OK | CHILD SEAT |
| ... | ... | ... | ... | ... | ... | ... |

FIG. 5

RESERVATION INFORMATION (BUSINESS OPERATOR B)    ⟋800B

| VEHICLE ID | 0:00-1:00 | 1:00-2:00 | 2:00-3:00 | ⋯ | 23:00-24:00 |
|---|---|---|---|---|---|
| B001 | ○ | — | — | ⋯ | ○ |
| B002 | ○ | — | ○ | ⋯ | ○ |
| B003 | — | ○ | ○ | ⋯ | ○ |
| ⋮ | ⋮ | ⋮ | ⋮ | ⋮ | ⋮ |

FIG. 6

PRICE RANGE INFORMATION    ⟋950

| PRICE RANGE | PRICE RANGE TYPE |
|---|---|
| LOWER THAN X1 | V1 |
| X1 OR HIGHER AND LOWER THAN X2 | V2 |
| X2 OR HIGHER AND LOWER THAN X3 | V3 |
| X3 OR HIGHER | V4 |

FIG. 7

USE CONDITION

| DATE | USE START HOUR | USE END HOUR | SELECTED AREA | VEHICLE TYPE | NUMBER OF RIDING PERSONS | PRICE RANGE | DROP-OFF REQUEST | DROP-OFF AREA | OPTION |
|---|---|---|---|---|---|---|---|---|---|
| xxxx/xx/xx | 2:00 | 3:00 | SECOND AREA | SMALL SIZE & MEDIUM SIZE | 2 | V2 | REQUEST | FIRST AREA | STUDLESS |

FIG. 8

PRESENTATION INFORMATION
1000

| BUSINESS OPERATOR NAME | VEHICLE NAME | RIDING CAPACITY | PRICE | DROP-OFF | OPTION |
|---|---|---|---|---|---|
| BUSINESS OPERATOR A | × × × | 5 | XX | OK | STUDLESS |
| BUSINESS OPERATOR B | △ △ △ | 5 | YY | OK | STUDLESS |
| ⋮ | ⋮ | ⋮ | ⋮ | ⋮ | ⋮ |

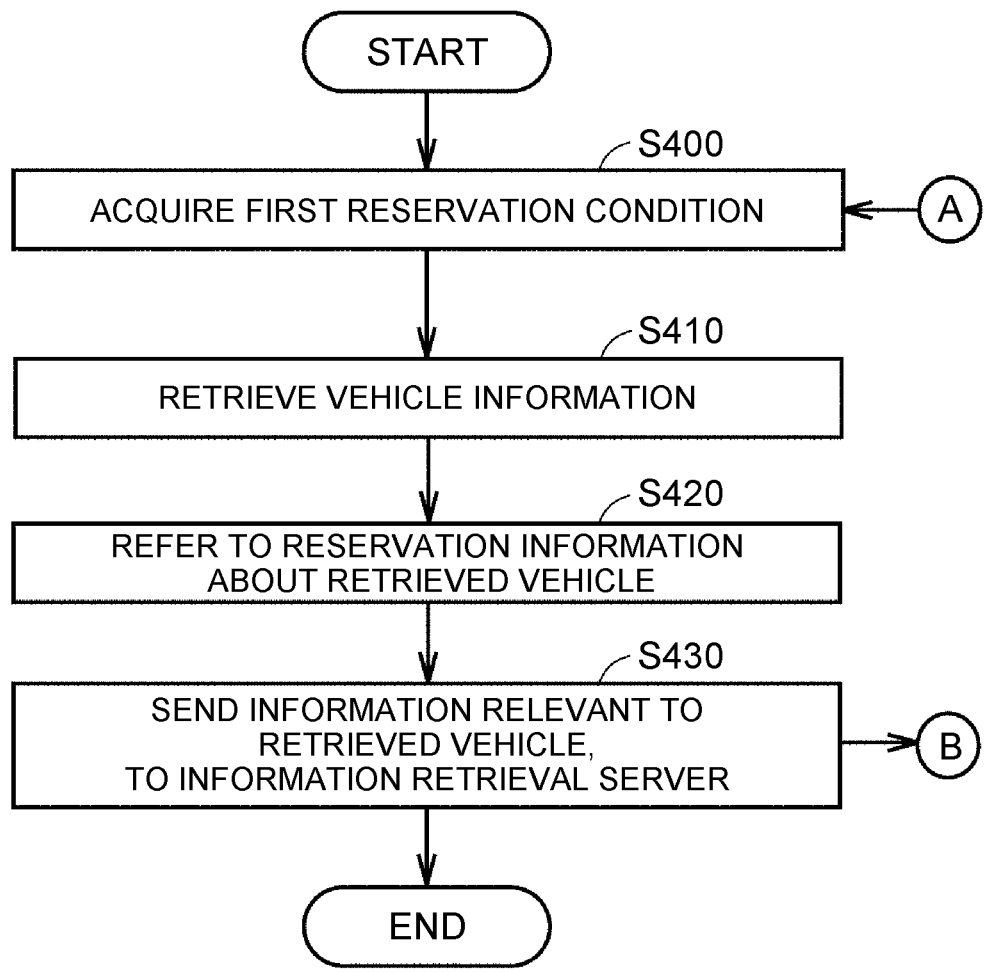

FIG. 13

BUSINESS INFORMATION 750

| BUSINESS OPERATOR | BUSINESS AREA | HELD VEHICLE TYPE | LOWEST PRICE RANGE TYPE | DROP-OFF |
|---|---|---|---|---|
| BUSINESS OPERATOR A | FIRST TO THIRD AREAS | SMALL SIZE & MEDIUM SIZE | V1 | OK |
| BUSINESS OPERATOR B | SECOND TO THIRD AREAS | SMALL SIZE & MEDIUM SIZE & LARGE SIZE | V2 | OK |

FIG. 16

USER INFORMATION 900

| USER ID | NAME | ADDRESS | VEHICLE TYPE | PRICE RANGE | DROP-OFF REQUEST |
|---------|--------|--------------|---------------------------|-------------|------------------|
| 001 | USER A | FIRST AREA | LARGE SIZE | V3 | — |
| 002 | USER B | FIRST AREA | SMALL SIZE & MEDIUM SIZE | V1 | REQUEST |
| 003 | USER C | SECOND AREA | SMALL SIZE | V2 | — |
| ⋮ | ⋮ | ⋮ | ⋮ | ⋮ | ⋮ |

INFORMATION RETRIEVAL SERVER, INFORMATION RETRIEVAL SYSTEM AND INFORMATION RETRIEVAL METHOD

CROSS-REFERENCE TO RELATED APPLICATIONS

This application claims priority to Japanese Patent Application No. 2018-070844 filed on Apr. 2, 2018, which is incorporated herein by reference in its entirety.

BACKGROUND

1. Technical Field

The disclosure relates to an information retrieval server, an information retrieval system and an information retrieval method, each of which performs an information presentation of a car sharing service.

2. Description of Related Art

Car sharing, in which a plurality of users uses a single vehicle in common has become commonplace. In car sharing, without owning a user's own vehicle, each user performs member registration to a car sharing business operator, and uses a vehicle owned by the business operator when necessary.

Japanese Patent Application Publication No. 2011-209960 (JP 2011-209960 A) discloses a car sharing system in which a user registered in a car sharing service of a business operator inputs a reservation condition for the car sharing service through connection to a server of the business operator, so that a vehicle satisfying the reservation condition is presented to the user.

SUMMARY

In recent years, since the car sharing service has prevailed, there is a plurality of car sharing services that is operated by different business operators. Therefore, the user to use the car sharing service possibly hopes to use a car sharing service that meets a user's need of the moment.

In the case of considering a plurality of car sharing services, in the car sharing service disclosed in JP 2011-209960 A, it is thought that the user performs connection to servers of the plurality of car sharing services individually, performs retrieval for each business operator, and compares and considers the retrieval results. Therefore, there is a concern that steps are required for the user to obtain a desired retrieval result.

The disclosure provides an information retrieval server to improve convenience for the user that uses a plurality of car sharing services to be operated by different business operators.

Hence, an information retrieval server according to a first aspect of the disclosure includes a communication device and a processing device. The communication device is configured to communicate with servers of a plurality of business operators and a communication terminal of a user through a communication network, each of the plurality of business operators performing a car sharing service. The processing device is configured to present information relevant to vehicles held by the plurality of business operators, to the user. The processing device is configured as follows. That is, the processing device is configured to: (i) acquire information input from the communication terminal, the information being information about a predetermined item included in a use condition for the car sharing service; (ii) cause the servers of the plurality of business operators to retrieve a vehicle from the held vehicles, the vehicle satisfying a use condition determined by the acquired information; and (iii) send information relevant to the retrieved vehicle, to the communication terminal.

An information retrieval system according to a second aspect of the disclosure includes servers of a plurality of business operators, a communication terminal of a user, and an information retrieval server. Each of the servers of the plurality of business operators is configured to perform a car sharing service. The communication terminal of the user is configured to use the car sharing service. The information retrieval server is configured to communicate with the servers of the plurality of business operators and the communication terminal through a communication network, and is configured to present information relevant to vehicles held by the plurality of business operators to the user. The communication terminal is configured to send information input by the user, to the information retrieval server, the information being information about a predetermined item included in a use condition. The information retrieval server is configured to cause the servers of the plurality of business operators to retrieve a vehicle from the held vehicles, the vehicle satisfying the use condition determined by the information acquired from the communication terminal. The information retrieval server is configured to send information relevant to the retrieved vehicle, to the communication terminal.

An information retrieval method according to a third aspect of the disclosure is for: communicating with servers of a plurality of business operators and a communication terminal of a user through a communication network, each of the plurality of business operators performing a car sharing service; and presenting information relevant to vehicles held by the plurality of business operators, to the user. The information retrieval method includes: acquiring information input from the communication terminal, the information being information about a predetermined item included in a use condition for the car sharing service; causing the servers of the plurality of business operators to retrieve a vehicle from the held vehicles, the vehicle satisfying a use condition determined by the acquired information; and sending information relevant to the retrieved vehicle, to the communication terminal.

With the configuration of the information retrieval server according to the first aspect, the information retrieval server acquires the use condition input to the communication terminal by the user. Then, the information retrieval server causes the servers of the plurality of business operators to retrieve the vehicle satisfying the use condition from the held vehicle. The information retrieval server arranges retrieval results (information relevant to the vehicle satisfying the use condition) acquired from the servers of the plurality of business operators, and collectively presents the retrieval results to the user. Thereby, the user can collectively retrieve vehicles registered in the servers of the plurality of business operators, by connecting the communication terminal to the information retrieval server and inputting the use condition. Accordingly, in the use of the car sharing service, the user does not need to retrieve the vehicle with individual connection to the servers of the plurality of business operators, so that convenience for the user is improved.

The information retrieval server according to the first aspect may further include a storage device configured to store business information of the plurality of business operators. The processing device may be configured as follows. That is, the processing device may be configured to: (i) extract a previously-determined item included in the use condition, as a retrieval condition; (ii) retrieve a business operator having business information from the business information of the plurality of business operator stored in the storage device, the business information satisfying the retrieval condition; and (iii) cause the server of the retrieved business operator to retrieve the vehicle from vehicles held by the retrieved business operator.

When the retrieval of the vehicle satisfying the use condition is performed for all vehicles registered in the servers of the plurality of business operators, there is a possibility of increase in the time required for the retrieval of the vehicle. In the above configuration of the information retrieval server according to the first aspect, the previously-determined item is extracted as the retrieval condition from the use condition input by the user. The information retrieval server selects the server of the business operator that should retrieve the vehicle, based on the business information previously stored in the storage device, and causes the selected server of the business operator to retrieve the vehicle. Thus, the retrieval of the vehicle is not performed for the server of a business operator not satisfying the retrieval condition, and therefore, it is possible to improve efficiency of the retrieval, and to present the retrieval results to the user in a short time. Accordingly, it is possible to improve convenience for the user.

The storage device may be configured to further store user information. The processing device may be configured to complement the use condition by using information included in the user information, when information about at least one predetermined item included in the use condition is not input and the item about which the information is not input is included in the user information. The processing device may be configured to cause the server of the retrieved business operator to retrieve the vehicle by using the complemented use condition.

For example, there can be a case where the user does not input all items of the use condition that are required to be input, when the user connects the communication terminal to the information retrieval server. In such a case, because of a poor use condition, there is a possibility that the retrieval results include information relevant to a vehicle that does not match a user's latent need. However, in the configuration of the information retrieval server described above, even if the use condition is insufficient, the use condition is complemented by using the user information, when the insufficient use condition is included in the user information (member registration information). Thereby, for example, even if the user sends a blank without inputting the use condition, it is possible to retrieve the vehicle by using the complemented use condition. Accordingly, it is possible to present information (the retrieval results) relevant to a vehicle that matches the user's latent need.

In the first aspect, the processing device may be configured to input the use condition by voice.

In the above configuration of the information retrieval server according to the first aspect, the user can perform voice input for the input of the use condition to the communication terminal. Thereby, the user can input the use condition without inputting characters by using a keypad or the like, and can retrieve information more easily.

In the first aspect, the processing device may be configured to cause the servers of the plurality of business operators to perform an advance preliminary retrieval, and then, cause the servers of the plurality of business operators to retrieve the vehicle from the held vehicles, the vehicle satisfying the use condition determined by the acquired information.

In the configuration of the information retrieval server according to the first aspect, when the processing device causes the servers of the plurality of business operators to retrieve the vehicle satisfying the use condition, the preliminary retrieval is performed before a detail retrieval is performed, and therefore, it is possible to shorten the time required for the retrieval. Thereby, it is possible to efficiently perform the retrieval.

In the first aspect, the storage device may be configured to record information input by the user at a time of member registration of the user. The processing device may be configured to retrieve the vehicle in a state where the user has logged in to the information retrieval server.

In the configuration of the information retrieval server according to the first aspect, when the user performs the reservation of the vehicle by using the information relevant to the vehicle that is displayed on the communication terminal, if the user has performed the member registration, the user can perform the reservation of the vehicle by using the information input by the user at a time of member registration of the user without inputting the information of the user necessary for the reservation of the vehicle each time.

In the information retrieval system according to the second aspect, the communication terminal may include an artificial intelligence configured to extract the use condition from information input by voice from the user. The information retrieval server may be configured to store user information. The information retrieval server may be configured to complement the use condition by using information included in the user information, when information about at least one predetermined item included in the use condition is not extracted by the artificial intelligence and the item about which the information is not extracted is included in the user information. The information retrieval server may be configured to cause the servers of the plurality of business operators to retrieve the vehicle by using the complemented use condition.

In the above configuration of the information retrieval server according to the second aspect, for example, when the user performs the input to the communication terminal by voice, the artificial intelligence extracts the use condition from the input voice information. Then, the information retrieval server acquires the extracted use condition, and complements the use condition by using the user information when the use condition is insufficient. Thereby, the user can retrieve the vehicle not by inputting the information in accordance with a fixed form for the use condition but simply by inputting the information as if by performing conversation, for example, at the time of the input of the use condition.

With the disclosure, it is possible to improve convenience for the user that uses a plurality of car sharing services to be operated by different business operators.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a diagram showing an example of vehicle information of a business operator A according to the first embodiment;

FIG. 3 is a diagram showing an example of reservation information of the business operator A according to the first embodiment;

FIG. 4 is a diagram showing an example of vehicle information of a business operator B according to the first embodiment;

FIG. 5 is a diagram showing an example of reservation information of the business operator B according to the first embodiment;

FIG. 6 is a diagram showing an example of price range information according to the first embodiment;

FIG. 7 is a diagram showing an example of a use condition according to the first embodiment;

FIG. 8 is a diagram showing an example of information (presentation information) that is displayed on a display unit according to the first embodiment;

FIG. 11 is a flowchart showing a process in retrieval that is executed by a first server according to the first embodiment;

FIG. 12 is a diagram showing an example of a retrieval condition according to a first modification of the first embodiment;

FIG. 13 is a diagram showing an example of business information according to the first modification;

FIG. 1S is a flowchart showing a process in retrieval that is executed by an information retrieval server according to the first modification;

FIG. 16 is a diagram showing an example of user information according to a second modification of the first embodiment;

DETAILED DESCRIPTION OF EMBODIMENTS

Figure 1:
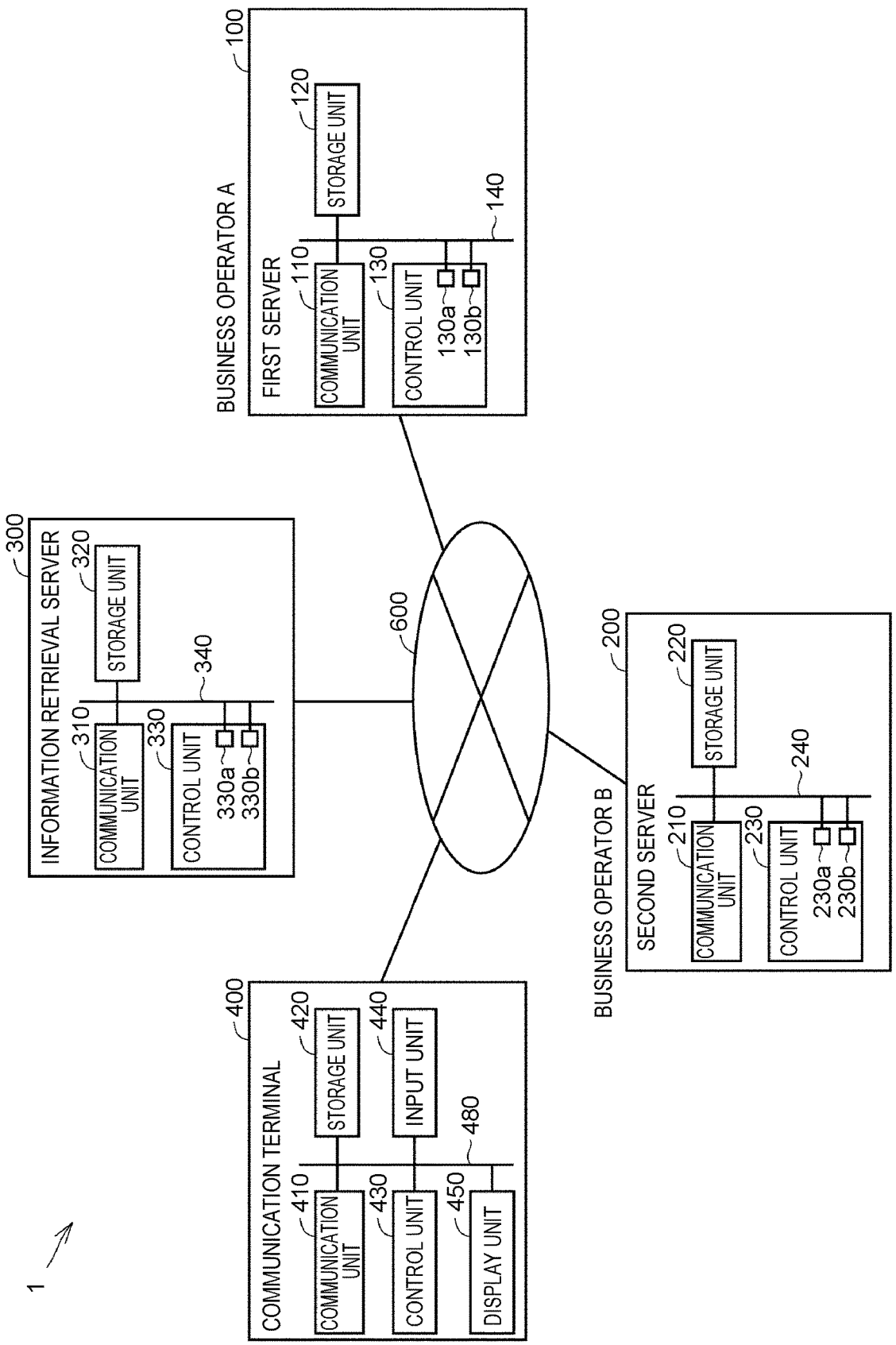
FIG. 1 is a diagram schematically showing an overall configuration of an information retrieval system according to a first embodiment of the disclosure.

Hereinafter, embodiments of the disclosure will be described in detail, with reference to the drawings. In the drawings, identical or equivalent parts are denoted by identical reference characters, and descriptions therefor are omitted.

An overall configuration of an information retrieval system will be described. FIG. 1 is a diagram schematically showing an overall configuration of an information retrieval system 1 according to a first embodiment. With reference to FIG. 1, the information retrieval system 1 includes a first server 100, a second server 200, an information retrieval server 300, and a communication terminal 400.

The first server 100 and the second server 200 are respectively servers of a business operator A and a business operator B that perform car sharing services. A user that hopes to use the car sharing service of the business operator A or the business operator B connects the communication terminal 400 (a smartphone, a personal computer or the like) to the first server 100 or the second server 200, and inputs conditions for a desired vehicle, to retrieve the vehicle.

The communication terminal 400 includes a communication unit 410, a storage unit 420, a control unit 430, an input unit 440 and a display unit 450. The respective units are communicably connected to each other by a communication bus 480.

The communication unit 410 is configured to be capable of communicating with a communication unit 110 of the first server 100, a communication unit 210 of the second server 200 and a communication unit 310 of the information retrieval server 300. The communication of the communication unit 410 with the communication unit 110, the communication unit 210 and the communication unit 310 is mutually performed through a communication network 600 such as the internet or a telephone line.

For example, the storage unit 420 includes a large-capacity storage device such as a flash memory, a hard disk or a solid-state drive. The storage unit 420 stores programs for executing various functions of the communication terminal 400, and the like.

The control unit 430 displays, on the display unit 450, a screen for inputting information about items included in a first reservation condition and a second reservation condition, based on information received through the communication unit 410 at the time of the connection to the first server 100 and the second server 200. The first reservation condition is a condition for causing the first server 100 to retrieve the vehicle. The second reservation condition is a condition for causing the second server 200 to retrieve the vehicle.

As a specific example, the first reservation condition includes "date and hour when the user hopes to use the vehicle", "place where the user hopes to rent the vehicle", "vehicle type", and the like. Hereinafter, the first reservation condition and the second reservation condition are also collectively referred to as merely "reservation condition".

Further, the control unit 430 receives information (information relevant to the vehicle) of results of the retrievals with the input first reservation condition and second reservation condition, from the first server 100 and the second server 200, respectively, and displays the received information on the display unit 450.

The input unit 440 is an input device in the communication terminal 400. The input unit 440, which is constituted by a keyboard, a mouse, a touch panel and the like, accepts an input operation to the keyboard, the mouse, the touch panel and the like. Further, the input unit 440 may be a voice input device having a voice input function.

The display unit 450 is a display device that displays an image in accordance with a control by the control unit 430. For example, the display unit 450 is realized by a liquid crystal panel or the like. The display unit 450 displays a screen for inputting the first reservation condition when the communication terminal 400 is connected to the first server 100. Further, the display unit 450 displays a screen for inputting the second reservation condition when the communication terminal 400 is connected to the second server 200.

The display unit 450 displays the retrieval result (the information relevant to the vehicle) received from the first server 100 or the second server 200.

The first server 100 includes the communication unit 110, a storage unit 120 and a control unit 130. The respective units are communicably connected to each other by a communication bus 140.

The communication unit 110 is configured to be capable of communicating with the communication unit 310 of the information retrieval server 300, the communication unit 210 of the second server 200, and the communication unit 410 of the communication terminal 400 of the user. The communication of the communication unit 110 with the communication unit 310, the communication unit 210 and the communication unit 410 is mutually performed through the communication network 600.

For example, the storage unit 120 includes a large-capacity storage device such as a hard disk or a solid-state drive. In the storage unit 120, for example, information about vehicles held by the business operator A, which is information shown in vehicle information 700A (FIG. 2), and information about reservation statuses of the held vehicles, which is information shown in reservation information 800A (FIG. 3), are stored.

The control unit 130 includes a central processing unit (CPU) 130a, a memory (a ROM and a RAM) 130b, input-output ports (not illustrated) for inputting and outputting various signals, and the like. The control unit 130 is configured to execute a predetermined computation process based on information stored in the storage unit 120 and information received from the information retrieval server 300 and the communication terminal 400 through the communication unit 110.

For example, the information received by the control unit 130 is the first reservation condition sent from the communication terminal 400 connected to the first server 100. The first server 100 can arbitrarily set the item that can be input as the first reservation condition. The control unit 130 retrieves the vehicle satisfying the first reservation condition, by using the vehicle information 700A and reservation information 800A stored in the storage unit 120, and sends information relevant to the vehicle satisfying the first reservation condition, to the communication terminal 400 through the communication unit 110.

Further, when the communication terminal 400 is connected to the first server 100, the control unit 130 sends information for displaying the screen for inputting the item included in the first reservation condition, to the communication terminal 400 through the communication unit 110.

Here, the vehicle information 700A and the reservation information 800A will be described with a specific example.

Next, the vehicle information will be described. FIG. 2 is a diagram showing an example of the vehicle information 700A of the business operator A according to the first embodiment. As shown in FIG. 2, for example, the vehicle information 700A includes information of "vehicle ID", "disposition area", "vehicle type", "riding capacity". "price range type", "drop-off" and "available option".

The "vehicle ID" is information indicating an ID assigned for each vehicle that is held by the business operator A. The vehicle ID is used for identifying the vehicle individually.

The "disposition area" is information indicating an area where the vehicle is disposed. For example, the "disposition area" may be information about an area containing a station where the vehicle is disposed. The "disposition area" may be information about the station where the vehicle is disposed.

The "vehicle type" is information indicating a vehicle type corresponding to the vehicle. In the embodiment, an example in which three types of "small size", "medium size" and "large size" are used as the vehicle type is used will be described. What type each vehicle belongs to is determined and registered in accordance with a criterion determined by the information retrieval server 300.

The "riding capacity" is information indicating the number of persons that can ride on the vehicle. For example, in FIG. 2, it is shown that the riding capacity of a vehicle with the vehicle ID: A001 is four.

The "price range type" is information indicating the price range of the vehicle. As the price rang type, the use price of the vehicle per unit time is selected by referring to later-described price range information 950 (FIG. 6). The price range type may be information indicating the price of the vehicle per unit time.

The "drop-off" is information indicating whether the vehicle is a vehicle allowing a drop-off. The drop-off means that the user returns the vehicle at a place different from a place (for example, station) where the user rents the vehicle. For example, in FIG. 2, it is shown that the vehicle with the vehicle ID: A001 is a vehicle allowing the drop-off. In the vehicle information 700A shown in FIG. 2, in the case where the information of "drop-off" is information indicating that the vehicle is a vehicle allowing the drop-off, "OK" is displayed, and in the case where the information of "drop-off" is information indicating that the vehicle is not a vehicle allowing the drop-off, "NG" is displayed.

In the first embodiment, an example in which whether the drop-off of the vehicle is allowed is set uniformly on a business operator basis. That is, when the business operator A is a business operator allowing the drop-off of the vehicle, all vehicles held by the business operator A are registered as the vehicle allowing the drop-off. Incidentally, in an identical business operator, whether the drop-off is allowed may be set on a vehicle basis.

The "available option" is information indicating an option that can be selected. For example, the option is attachment of studless tires, rental of a child seat, existence of a sunroof, and the like. In the case where the information of "available option" is information indicating that the attachment of studless tires can be selected, "STUDLESS" is displayed in FIG. 2. In the case where there is no option that can be selected, "–" is displayed in FIG. 2.

In the example shown in FIG. 2, the vehicle with the vehicle ID: A001 is disposed in a first area. Further, for the vehicle with the vehicle ID: A001, the vehicle type is the small size, and the riding capacity is four. Further, for the vehicle with the vehicle ID: A001, the price range type per unit time is a price range type V1, and the attachment of studless tires can be selected as the option.

Next, the reservation information will be described. FIG. 3 is a diagram showing an example of the reservation information 800A of the business operator A according to the first embodiment. The reservation information 800A indicates reservation statuses of the vehicles held by the business operator A on one day. In the first server 100, the information shown in the reservation information 800A is stored on a date basis.

As shown in FIG. 3, for example, the reservation information 800A includes information of "vehicle ID" and "reservation status in each time period". FIG. 3 shows an example in which the time period is separated on a one-hour basis. The time period is not limited to the separation of the time period on a one-hour basis. For 26 example, the time period may be separated on a two-hour basis, or may be separated on a 15-minute basis or on a 30-minute basis. It is allowable to adopt a configuration in which the user can make a reservation while designating an arbitrary time, without providing the time period.

As the "reservation status in each time period", information of whether a reservation can be made is stored for each time period. In FIG. 3, in the case where the information indicates that the reservation of the vehicle can be made (in the case where no other reservation has been made), "o" is displayed, and in the case where the reservation of the vehicle cannot be made (in the case where another reservation has already been made), "–" is displayed.

In the example shown in FIG. 3, for the vehicle with the vehicle ID: A001, in time periods of 0: 00 to 1: 00 and 23: 00 to 24: 00, the reservation can be made. In time periods of 1: 00 to 2: 00 and 2: 00 to 3: 00, the reservation cannot be made.

Back to FIG. 1, the second server 200 includes the communication unit 210, a storage unit 220 and a control unit 230. The respective units are communicably connected to each other by a communication bus 240.

For example, the storage unit 220 includes a large-capacity storage device such as a hard disk or a solid-state drive. In the storage unit 220, for example, information about vehicles held by the business operator B, which is information shown in vehicle information 700B (FIG. 4), and information about reservation statuses of the held vehicles, which is information shown in reservation information 800B (FIG. 5), are stored. The vehicle information 700B and the reservation information 800B are the same as the vehicle information 700A and the reservation information 800A, respectively, and therefore, repetitive descriptions are omitted.

The functions of the communication unit 210 and control unit 230 of the second server 200 are the same as the functions of the communication unit 110 and control unit 130 of the first server 100, respectively, and therefore, repetitive descriptions are omitted. The control unit 230 of the second server 200 retrieves a vehicle satisfying the second reservation condition received through the communication network 600, by using the vehicle information 700B and reservation information 800B stored in the storage unit 220, and sends information relevant to the retrieved vehicle, to the communication terminal 400 through the communication unit 210.

The user that hopes to use the car sharing service, for example, connects the communication terminal 400 to the first server 100 of the business operator A, and inputs the first reservation condition from the communication terminal 400. Thereby, the vehicle satisfying the first reservation condition is retrieved from the vehicles registered in the first server 100 of the business operator A.

Here, there can be a case where the vehicle satisfying the first reservation condition is not found, or a case where the vehicle satisfying the first reservation condition is found and where the user hopes to compare prices between the found vehicle and vehicles held by another business operator. In such a case, the user further connects the communication terminal 400 to the second server 200 of the business operator B, and retrieves the vehicle similarly. The user repeatedly performs the above action to servers of a plurality of business operators, and thereby, can compare and consider the car sharing services of the business operators.

However, as described above, the user needs to retrieve the vehicle for each of the services of the business operators. When the number of business operators as the retrieval object increases, there is a concern that steps are required to obtain a desired retrieval result, so that convenience decreases.

Hence, the information retrieval system 1 according to the first embodiment further includes the information retrieval server 300. The user connects the communication terminal 400 to the information retrieval server 300, and inputs a use condition 500. Based on the acquired use condition 500, the information retrieval server 300 sequentially connects to the servers (the first server 100 and the second server 200) of the business operators registered in the information retrieval server 300, and causes the first server 100 and the second server 200 to retrieve the vehicle. Thereby, when the user inputs the use condition 500 through the connection to the information retrieval server 300, it is possible to automatically retrieve the desired vehicle from the vehicles registered in the servers of the business operators.

Each business operator is registered in the information retrieval server 300, as the business operator that performs the car sharing service, and thereby, the server (the first server 100 or the second server 200) of the business operator can be retrieved in the retrieval of the vehicle by the information retrieval server 300.

In an example described below, the business operators registered in the information retrieval server 300 are the business operator A and the business operator B. The number of the business operators registered in the information retrieval server 300 is not limited to two, and three or more business operators may be registered.

The information retrieval server 300 includes the communication unit 310, a storage unit 320 and a control unit 330. The respective units are communicably connected to each other by a communication bus 340.

The communication unit 310 is configured to be capable of communicating with the communication unit 110 of the first server 100, the communication unit 210 of the second server 200 and the communication unit 410 of the communication terminal 400. The communication of the communication unit 310 with the communication unit 110, the communication unit 210 and the communication unit 410 is mutually performed through the communication network 600.

For example, the storage unit 320 includes a large-capacity storage device such as a hard disk or a solid-state drive. In the storage unit 320, for example, price range information 950 for classifying the use price of the vehicle per unit time into price range types is stored.

In the price range information 950, for example, as shown in FIG. 6, in the case where the price per unit time is lower than a price X1, a price range type V1 is assigned. In the case where the price per unit time is the price X1 or higher and is lower than a price X2 (X1<X2) that is higher than the price X1, a price range type V2 is assigned. In the case where the price per unit time is the price X2 or higher and is lower than a price X3 (X2<X3) that is higher than the price X2, a price range type V3 is assigned. In the case where the price per unit time is the price X3 or higher, a price range type V4 is assigned.

Back to FIG. 1, in the storage unit 320, the item of the first reservation condition for retrieving the vehicles held by the business operator A and the item of the second reservation condition for retrieving the vehicles held by the business operator B are stored.

The control unit 330 includes a central processing unit (CPU) 330a, a memory (a ROM and a RAM) 330b, input-output ports (not illustrated) for inputting and outputting various signals, and the like. The control unit 330 acquires information about the use condition 500 input to the communication terminal 400, through the communication unit 310.

The use condition 500 is a condition for which the user hopes in the use of the vehicle held by the car sharing business operator. The use condition 500 is input by the user, by using the communication terminal 400. The use condition 500 includes information indicating date and hour when the user hopes to use the vehicle, and information indicating items for a vehicle that the user hopes to rent and the like.

For example, as shown in FIG. 7, the use condition 500 includes information of "date", "use start hour", "use end hour", "selected area", "vehicle type", "number of riding persons", "price range", "drop-off request", "drop-off area" and "option".

The "date" is information indicating a date when the user hopes to use the car sharing service (vehicle). The "use start hour" is information indicating an hour when the user hopes to rent the vehicle. The "use end hour" is information indicating an hour when the user hopes to return the vehicle. The "number of riding persons" is information indicating the number of persons planned to ride.

The "selected area" is information indicating an area when the user hopes to rent the vehicle. In FIG. 7, a second area is displayed as an example. The unit of the area can be arbitrarily set, and for example, a prefecture, a local government or the like may be set. Further, for example, the area may be set based on the position at the time of the input of the use condition 500. The position is acquired by using a global positioning system (GPS) mounted on the communication terminal 400. For example, the area may be set so as to be within a predetermined radius around the acquired position.

The "vehicle type" is information indicating the type of the vehicle to be displayed as the retrieval result (the vehicle that the user hopes to use), and for example, three types of "small size", "medium size" and "large size" are used. As the vehicle type, for example, a specific vehicle model name may be registered.

The "price range" is information indicating the price range type per unit time to be displayed as the retrieval result (the price range type for which the user hopes). In the first embodiment, a vehicle having a price range type equal to or lower than the selected price range type is displayed as the retrieval result. The price range type is selected in accordance with the price range information 950. In FIG. 7, as an example, the price range type V2 is displayed. As the retrieval result, vehicles having the price range type V2 and vehicles having the price range type V1 lower than the price range type V2 are displayed. The vehicle to be displayed as the retrieval result is not limited to vehicles having price range types that are equal to or lower than the price range type set as the "price range". For example, the vehicle to be displayed as the retrieval result may include vehicles having price range types that are equal to or higher than the price range type set as the "price range", or may include only vehicles having the price range type set as the "price range". Further, the unit time can be arbitrarily set. For example, the unit time is set to 15 minutes, 30 minutes, 1 hour or the like.

The "drop-off request" is information indicating whether the user hopes to drop off the rend vehicle. For example, a checkbox that is checked when the user hopes to drop off the vehicle is displayed on the screen for inputting the use condition 500. In the case where the "drop-off request" is designated, vehicles allowing drop-off are displayed as the retrieval result. In the case where the "drop-off request" is not designated, both vehicles allowing drop-off and vehicles not allowing drop-off are displayed as the retrieval result.

The "drop-off area" is information indicating an area where the user hopes to drop off the vehicle. The "option" is information indicating a vehicle option for which the user hopes.

Back to FIG. 1, the control unit 330 extracts information about each item of the first reservation condition, from the use condition 500, and sends the information to the first server 100. Similarly, the control unit 330 extracts information about each item of the second reservation condition, from the use condition 500, and sends the information to the second server 200.

The control unit 330 acquires information relevant to the vehicle satisfying the first reservation condition, from the first server 100, as the retrieval result of the first reservation condition. Further, the control unit 330 acquires information relevant to the vehicle satisfying the second reservation condition, from the second server 200, as the retrieval result of the second reservation condition. Then, the control unit 330 arranges the information relevant to the vehicles acquired from both the first server 100 and the second server 200, and collectively outputs (sends) the information to the communication terminal 400. The communication terminal 400 displays the information relevant to the vehicles sent from the control unit 330, on the display unit 450.

Next, presentation information will be described. FIG. 8 is a diagram showing an example of information (presentation information 1000) that is displayed on the display unit 450 according to the first embodiment. The presentation information 1000 is displayed (presented) on the display unit 450 of the communication terminal 400, as a result of the retrieval by using the information retrieval server 300 by the user. For example, the presentation information 1000 includes "business operator name", "vehicle name", "riding capacity", "price", "drop-off" and "option". The information of "business operator name", "vehicle name", "riding capacity", "price", "drop-off" and "option" corresponds to an example of the "information relevant to the vehicle" according to the disclosure.

The "business operator name" is information indicating a business operator that holds the vehicle to be displayed as the retrieval result. The "vehicle name" is information indicating the vehicle model name of the vehicle to be displayed as the retrieval result. For example, the vehicle model name is the name of the vehicle when the vehicle is commonly marketed. The "riding capacity" is information indicating the maximum number of persons that can ride on the vehicle to be displayed as the retrieval result. The "price" is information indicating the price per unit time of the vehicle to be displayed as the retrieval result. In the case where the vehicle to be displayed as the retrieval result allows selection of an option, the "price" may include information indicating the price of the option. The "drop-off" is information indicating whether the vehicle to be displayed as the retrieval result allows the drop-off of the vehicle. The "option" is information indicating an option that can be selected in the vehicle to be displayed as the retrieval result.

Figure 9:
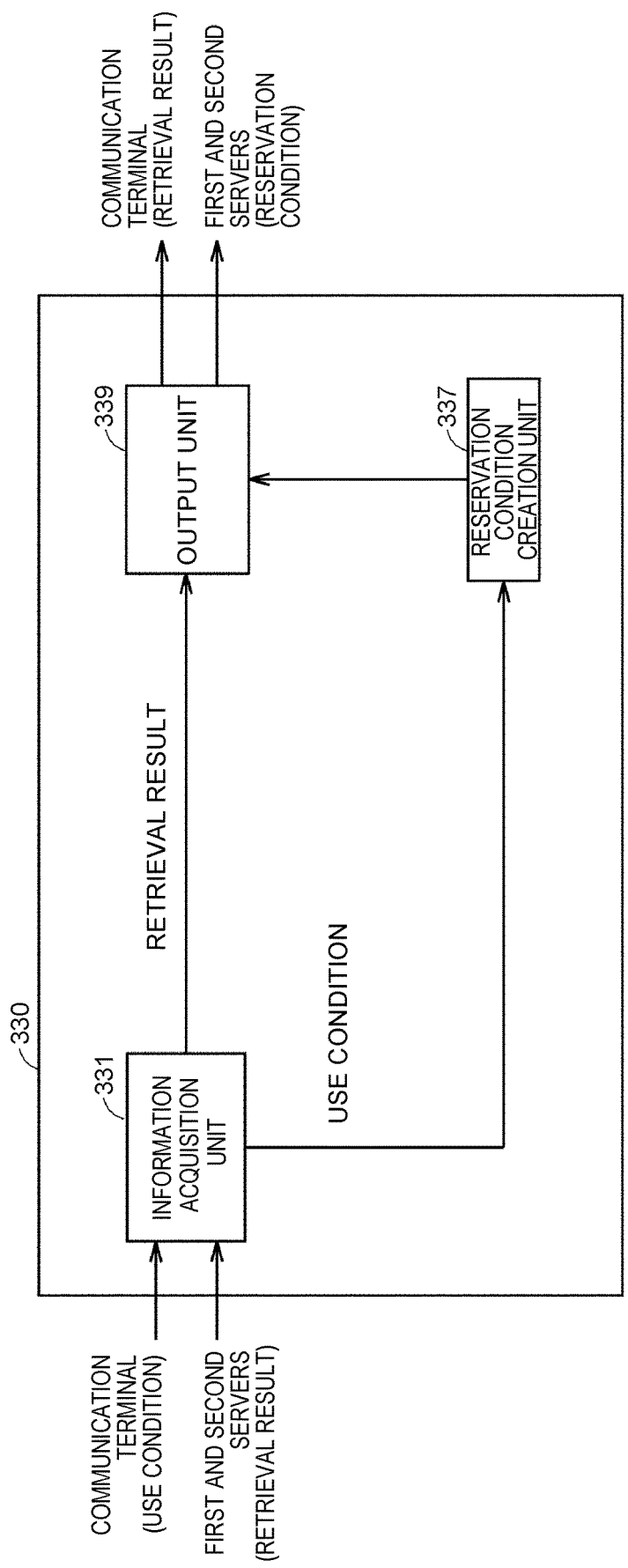
FIG. 9 is a functional block diagram showing a configuration of a control unit of an information retrieval server according to the first embodiment.

FIG. 9 is a functional block diagram showing a configuration of the control unit 330 of the information retrieval server 300 according to the first embodiment. The control unit 330 includes an information acquisition unit 331, a reservation condition creation unit 337 and an output unit 339.

The information acquisition unit 331 acquires the use condition 500 input from the communication terminal 400 of the user, through the communication unit 310. Further, the information acquisition unit 331 acquires the information relevant to the vehicle, from the servers (the first server 100 and the second server 200) of the business operators registered in the information retrieval server 300.

The reservation condition creation unit 337 creates the reservation condition determined by the business operators, by using the use condition 500. Specifically, for example, the reservation condition creation unit 337 reads the item of the first reservation condition of the business operator A, from the storage unit 320. Then, the reservation condition creation unit 337 extracts information about the item of the first reservation condition, from the use condition 500, and creates the first reservation condition. Similarly, the reservation condition creation unit 337 reads the item of the second reservation condition of the business operator B, and creates the second reservation condition of the business operator B.

The output unit 339 sends the reservation condition created by the reservation condition creation unit 337, to the servers (the first server 100 and the second server 200) of the business operators registered in the information retrieval server 300, through the communication unit 310. Further, the output unit 339 arranges the retrieval results acquired from the servers (the first server 100 and the second server 200) of the business operators, and collectively sends the retrieval results to the communication terminal 400.

Figure 10:
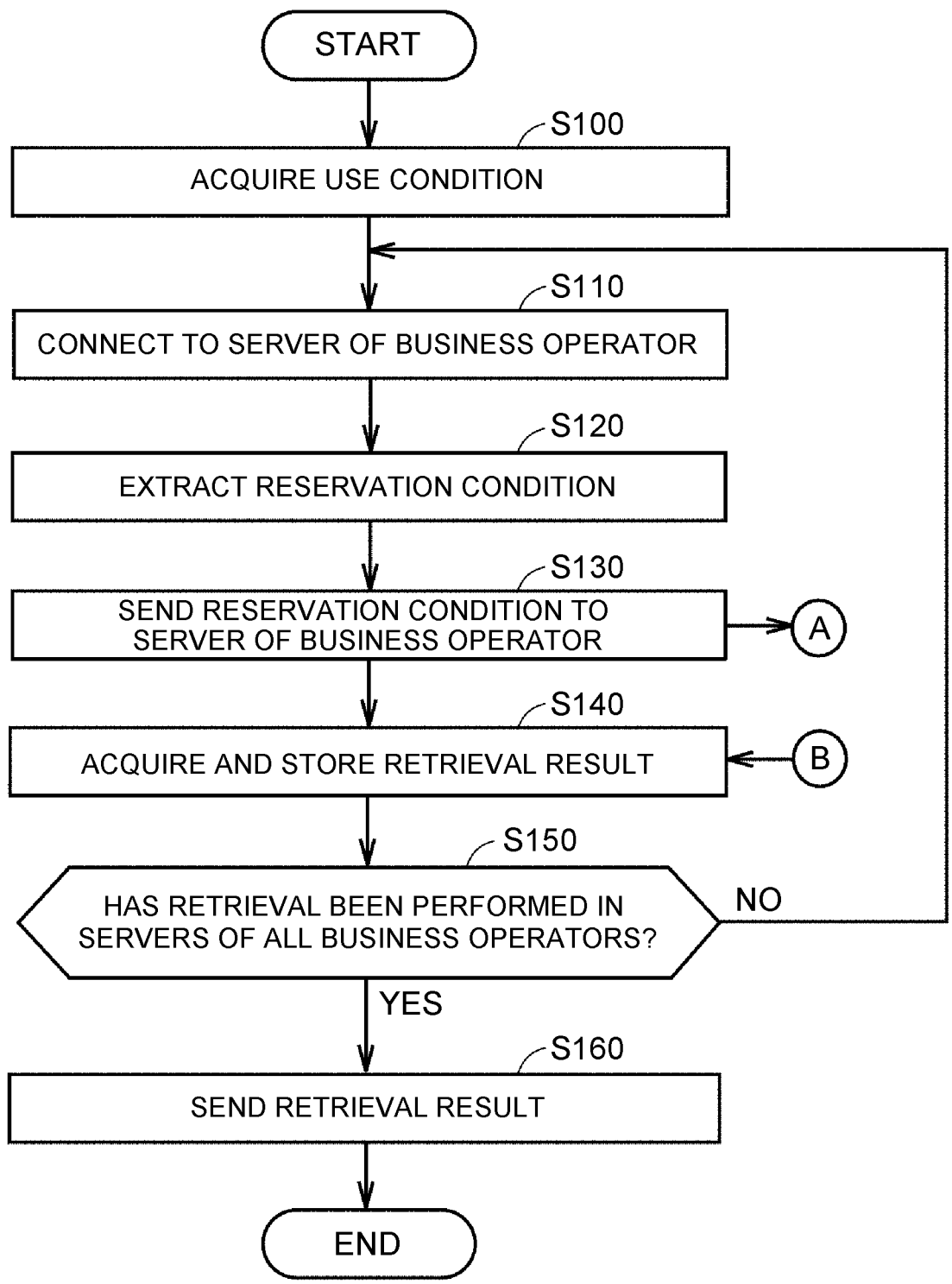
FIG. 10 is a flowchart showing a process in retrieval that is executed by the information retrieval server according to the first embodiment.

FIG. 10 is a flowchart showing a process in the retrieval that is executed by the information retrieval server 300 according to the first embodiment. This process is executed whenever the input of the use condition 500 is determined by using the communication terminal 400. A case where the steps of the flowchart shown in FIG. 10 are realized through software processing by the control unit 330 of the information retrieval server 300 will be described. However, some or all of the steps may be realized by hardware (electric circuit) created in the control unit 330. The same goes for FIG. 15 and FIG. 17.

The control unit 330 acquires the use condition 500 input to the communication terminal 400 by the user, through the communication network 600 (step 100; hereinafter, step is abbreviated to "S").

The control unit 330 connects to the servers of the business operators registered in the information retrieval server 300, through the communication unit 310 (S110). Specifically, for example, the control unit 330 connects the first server 100 of the business operator A, through the communication unit 310.

The control unit 330 reads the items of the first reservation condition from the storage unit 320, and extracts information corresponding to the items of the first reservation condition, from the use condition 500 (S120). As the first reservation condition, from the use condition 500, the control unit 330 may extract all of the items of the use condition 500, or may extract only some of the items.

Then, the control unit 330 sends the extracted first reservation condition to the first server 100 (S130). Thereby, the first server 100 retrieves the vehicle by using the first reservation condition.

The control unit 330 acquires the information relevant to the vehicle satisfying the first reservation condition, from the first server 100, as the retrieval result responding to S130, and then, stores the acquired information in the storage unit 320 (S140).

The control unit 330 determines whether the retrieval has been performed in the servers of all business operators registered in the information retrieval server 300 (S150).

When the control unit 330 determines that the retrieval has not been performed in the servers of all business operators registered in the information retrieval server 300 (NO in S150), the control unit 330 returns the process to S110, and executes the processes of S110 to S140 for the servers of the business operators in which the retrieval has not been performed yet.

When the control unit 330 determines that the retrieval has been performed in the servers of all business operators registered in the information retrieval server 300 (YES in S150), the control unit 330 arranges the information relevant to the vehicle that is acquired from the business operators stored in the storage unit 320, and collectively sends (outputs) the information to the communication terminal 400 as the retrieval results (S160). In the case where the vehicle satisfying the use condition 500 has not been retrieved, the control unit 330 sends information indicating that there is no vehicle satisfying the use condition 500, to the communication terminal 400.

Thereafter, the user can perform the reservation of the vehicle, based on the information (the presentation information 1000) relevant to the vehicle that is displayed on the communication terminal 400. In the setting of the reservation of the vehicle, the user may select an arbitrary vehicle from the presentation information 1000 displayed on the communication terminal 400, and thereby, a transition to a server (for example, the first server 100) of a business operator owning the selected vehicle may be performed. Thereby, the user can perform the reservation of the selected vehicle, following the retrieval. Alternatively, it is allowed to adopt a setting in which the reservation of the selected vehicle can be performed in the information retrieval server 300 when the user selects an arbitrary vehicle from the presentation information 1000 displayed on the communication terminal 400.

FIG. 11 is a flowchart showing a process in the retrieval that is executed by the first server 100 according to the first embodiment. This process is executed whenever the first reservation condition is sent from the information retrieval server 300 or the communication terminal 400. A case where the steps of the flowchart shown in FIG. 11 are realized through software processing by the control unit 130 of the first server 100 will be described. However, some or all of the steps may be realized by hardware (electric circuit) created in the control unit 130. An example in which the first reservation condition is sent from the information retrieval server 300 will be described later. Although not illustrated, also in the second server 200, the same process as the process in the first server 100 shown in FIG. 11 is executed when the second reservation condition is sent from the information retrieval server 300 or the communication terminal 400.

The control unit 130 acquires the first reservation condition from the information retrieval server 300 (S400). The control unit 130 then refers to the vehicle information 700A stored in the storage unit 120, and retrieves the vehicle satisfying the first reservation condition (S410). Specifically, the control unit 130 compares the items of "selected area", "vehicle type", "number of riding persons", "price range", "drop-off request", "drop-off area" and "option" of the use condition 500, with the items of "disposition area", "vehicle type", "riding capacity", "price range type", "drop-off" and "available option" of the vehicle information 700A, respectively. As an example, in the vehicle information 700A in FIG. 2, the vehicle retrieved with the use condition 500 shown in FIG. 7 is a vehicle with the vehicle ID: A002.

Next, the control unit 130 refers to the reservation information 800A about the vehicle retrieved in S410 (S420). Specifically, the control unit 130 compares the reservation information 800A about the vehicle with the vehicle ID: A002, with the "use start hour" and "use end hour" included in the use condition 500 in FIG. 7. In the example of the reservation information 800A in FIG. 3, the reservation of the vehicle with the vehicle ID: A002 in 2: 00 to 3: 00 is allowed, and therefore, the vehicle with the vehicle ID: A002 satisfies the first reservation condition.

The control unit 130 sends the information relevant to the vehicle satisfying the first reservation condition, to the information retrieval server 300 (S430).

As described above, in the first embodiment, the information retrieval server 300 creates the respective reservation conditions (the first and second reservation condition) for retrieving the vehicle registered in the servers of the business operators, by using the acquired use condition 500, and sends the reservation conditions to the servers of the business operators. The information retrieval server 300 then acquires the respective retrieval results (the information relevant to the vehicle satisfying the reservation condition) after the retrieval of the vehicle in the servers of the business operators. The information retrieval server 300 arranges the retrieval results, and collectively sends the retrieval results to the communication terminal 400. Thereby, the user can collectively obtain the retrieval results of the vehicles registered in the servers of the plurality of business operators, by inputting the use condition 500 through the connection to the single information retrieval server 300, without individually performing the connections to the servers of the plurality of business operators and the retrievals of the vehicle.

In the example described in the first embodiment, the first and second reservation conditions are created for causing the servers of the business operators to retrieve the vehicle by using the use condition 500. However, the disclosure is not limited to the creation of the first and second reservation conditions. For example, the servers of the business operators registered in the information retrieval server 300 may be configured to retrieve the vehicle by using the use condition 500 as a common reservation condition.

Next, a first modification of the first embodiment will be described. In the configuration described in the first embodiment, when the use condition 500 is input, the retrieval of the vehicle satisfying the use condition 500 is performed for all business operators registered in the information retrieval server 300. However, when the retrieval of the vehicle is performed for all business operators registered in the information retrieval server 300, there is a possibility of increase in the time required for the retrieval.

Hence, in an example in the first modification, a preliminary retrieval is performed in the servers of all business operators registered in the information retrieval server 300, and the retrieval of the vehicle is performed for only business operators satisfying the preliminary retrieval. Thereby, it is possible to shorten the time of the retrieval of the vehicle.

Specifically, some previously-determined items are extracted as a retrieval condition 550, from the input use condition 500. Further, a business operator satisfying the retrieval condition 550 is retrieved from business information 750 relevant to car sharing services that are performed by business operators registered in the information retrieval server 300. Then, the retrieval of the vehicle is performed for the retrieved business operator.

Thus, since the preliminary retrieval is performed, the retrieval of the vehicle is performed to only some business operators. Therefore, it is possible to shorten the time required for the retrieval.

The retrieval condition and business information in the first modification will be described. Here, the retrieval condition 550 and the business information 750 will be specifically described. FIG. 12 is a diagram showing an example of the retrieval condition 550 according to the first modification. The retrieval condition 550 shows information of particular items extracted from the use condition 500. Specifically, as the retrieval condition 550, the "selected area", "vehicle type", "price range" and "drop-off request" are extracted from the use condition 500. The items extracted from the use condition 500 as the retrieval condition 550 is not limited to the above items, and another item may be extracted.

The business information 750 is information relevant to the car sharing services that performed by the business operators (the business operator A and the business operator B) registered in the information retrieval server 300. The business information 750 is stored in the storage unit 320 of the information retrieval server 300, when the business operator A and the business operator B are registered in the information retrieval server 300 as the business operator that performs the car sharing service.

For example, as shown in FIG. 13, the business information 750 includes information of "business operator", "business area", "held vehicle type", "lowest price range type" and "drop-off".

The "business operator" is information for identifying a business operator (the business operator A or the business operator B). The "business area" is information indicating an area where the business operator performs the car sharing service. The "held vehicle type" is information indicating the vehicle types of vehicles held by the business operator. The "lowest price range type" is information indicating the minimum price range type of the price range types of the vehicles held by the business operator. The "drop-off" is information indicating whether the business operator perform a car sharing service allowing the drop-off of the vehicle.

In the example of the business information 750 in FIG. 13, the business operator A performs the car sharing service in the first area, the second area and the third area, and has stations in these areas. The business operator A holds vehicles that are classified into vehicle types of the small size and the medium size. Of the vehicles held by the business operator A, the vehicle in the lowest price range is a vehicle with the price range type V1. The business operator A provides a car sharing service allowing the drop-off.

Figure 14:
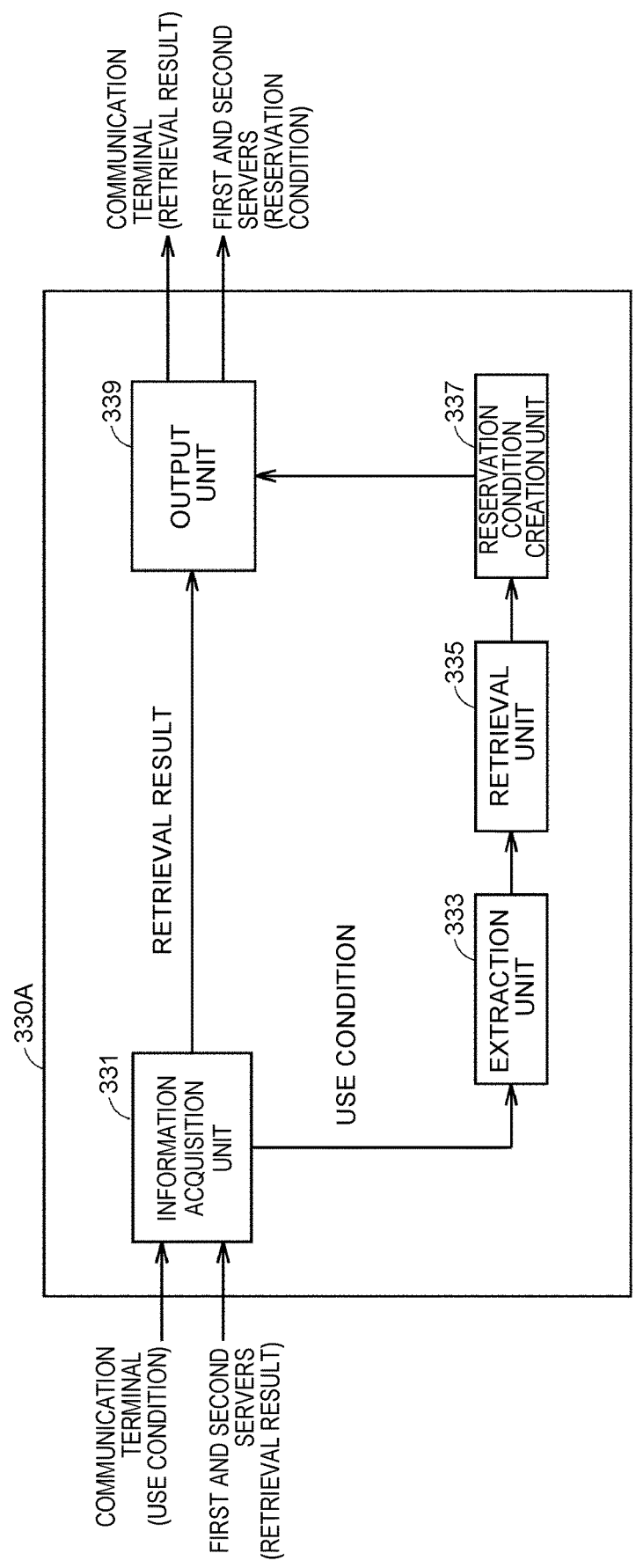
FIG. 14 is a functional block diagram showing a configuration of a control unit of an information retrieval server according to the first modification.

FIG. 14 is a functional block diagram showing a configuration of a control unit 330A of the information retrieval server 300 according to the first modification. The control unit 330A includes the information acquisition unit 331, an extraction unit 333, a retrieval unit 335, a reservation condition creation unit 337 and the output unit 339. The functional block diagram shown in FIG. 14 is a diagram in which the extraction unit 333 and the retrieval unit 335 are added to the functional block diagram shown in FIG. 9. The other units are the same as the units in the functional block diagram shown in FIG. 9, and therefore, repetitive descriptions are omitted.

The extraction unit 333 extracts previously-determined items, as the retrieval condition 550, from the items of the use condition 500. The retrieval condition 550 is used for performing the preliminary retrieval for the servers of the plurality of business operators (the first server and the second server).

The retrieval unit 335 retrieves the business operator satisfying the retrieval condition 550, from the business information 750 stored in the storage unit 320. Specifically, the retrieval unit 335 performs the retrieval by whether the information about the business operator A and the information about the business operator B that are included in the business information 750 satisfy the retrieval condition 550. Then, the reservation condition creation unit 337 creates the reservation condition only for the business operator satisfying the retrieval condition.

Figure 15:
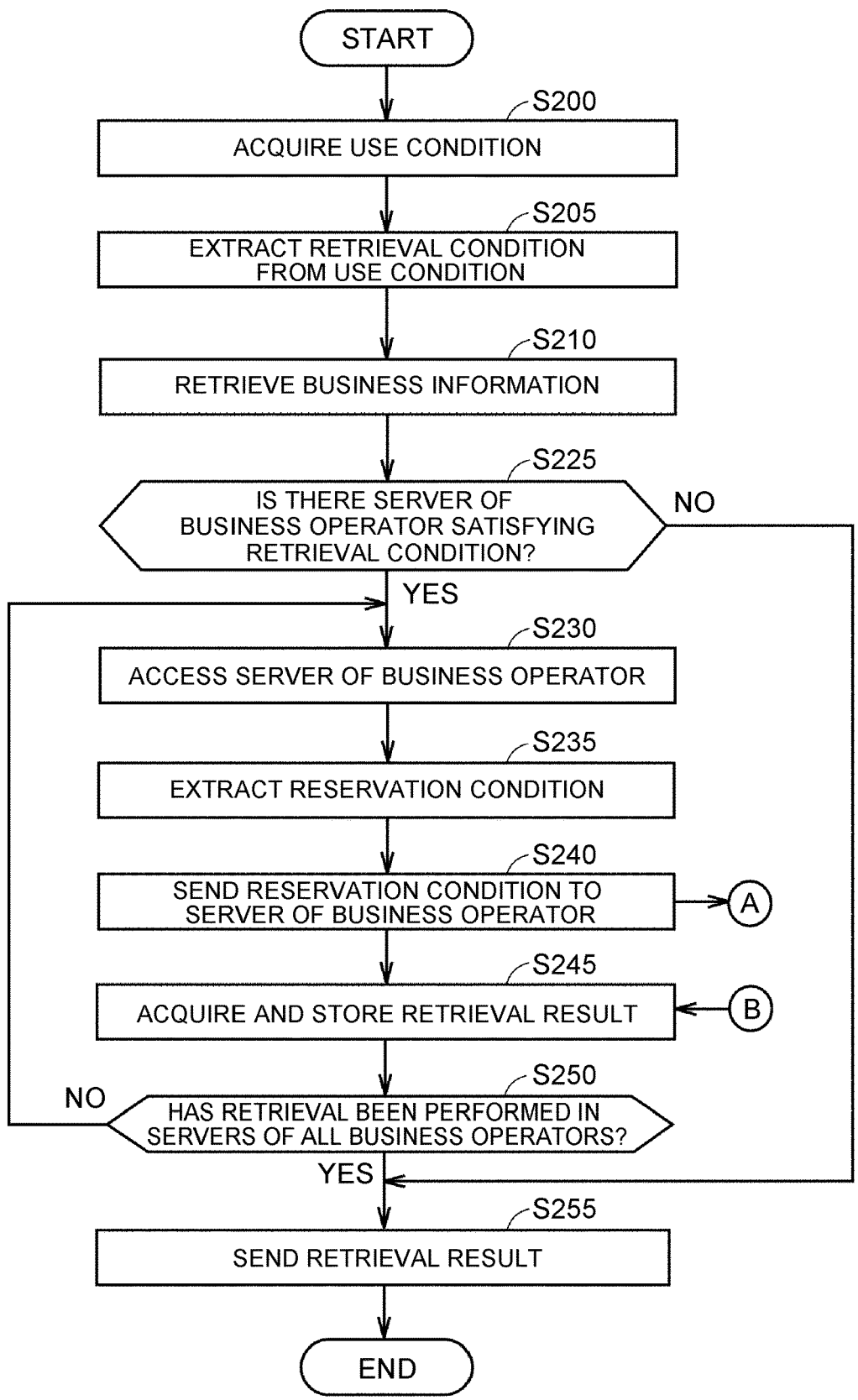

FIG. 15 is a flowchart showing a process in the retrieval that is executed by the information retrieval server 300 according to the first modification. The flowchart shown in FIG. 15 is a flowchart in which S205 to S225 are added to the flowchart shown in FIG. 10. The other steps are the same as the steps in the flowchart shown in FIG. 10, and therefore, repetitive descriptions are omitted. Further, the processes to be executed in the first server 100 and the second server 200 are also the same as the steps in the flowchart shown in FIG. 11, and therefore, repetitive descriptions are omitted.

The control unit 330A acquires the use condition 500 input to the communication terminal 400 by the user, through the communication network 600 (S200).

The control unit 330A extracts the previously-determined items, as the retrieval condition 550, from the use condition 500 (S205). Specifically, the control unit 330A extracts the items of "selected area", "vehicle type", "price range" and "drop-off", as the retrieval condition 550, from the use condition 500.

The control unit 330A reads the business information 750 stored in the storage unit 320, and retrieves the business operator satisfying the retrieval condition 550 (S210). Specifically, for example, the control unit 330A inquires whether the "selected area", "vehicle type", "price range" and "drop-off request" of the retrieval condition 550 are included in the "business area", "held vehicle type", "lowest price range type" and "drop-off" of the business information 750, respectively. Hereinafter, the inquiry of S210 is also referred to as "preliminary retrieval".

Specifically, in the example of the business operator A, the second area that is the "selected area" of the retrieval condition 550 is included in the first to third areas that are the "business area" of the business information 750. The small size and medium size that are the "vehicle type" of the retrieval condition 550 are included in the small size and medium size that are the "held vehicle type" of the business information 750. The price range type V2 that is the "price range" of the retrieval condition 550 is a price range higher than the price range type V1 that is the "lowest price range type" of the business information 750. Accordingly, the "price range" of the retrieval condition 550, which is a price range intended to be displayed by the user, is included in the "lowest price range type" of the business information 750. Further, the "drop-off request" of the retrieval condition 550 is "request", and the "drop-off" of the business information 750 is "OK". Accordingly, the condition of the "drop-off" is satisfied. Thus, the control unit 330A determines that the business information 750 of the business operator A satisfies the retrieval condition 550.

After the preliminary retrieval is completed, the control unit 330A determines whether there is a business operator satisfying the retrieval condition 550 (S225).

When the control unit 330A determines that there is a business operator satisfying the retrieval condition 550 (YES in S225), the control unit 330A executes the processes of S230 to S250 for the server of the business operator satisfying the retrieval condition 550. Thereby, the vehicle satisfying the use condition 500 is retrieved from the vehicles registered in the server of the business operator satisfying the retrieval condition 550.

When the control unit 330A determines that there is no business operator satisfying the retrieval condition 550 (NO in S225), the control unit 330A sends a retrieval result indicating that there is no vehicle satisfying the use condition 500, to the communication terminal 400 (S255).

Thus, in the first modification, first, the business operator satisfying the retrieval condition 550 is retrieved from the business information 750 stored in the information retrieval server 300. Then, the information retrieval server 300 connects to the server of the business operator satisfying the retrieval condition 550, and retrieves the vehicle satisfying the use condition 500, from the vehicles registered in the server of the business operator.

As described above, before the detailed retrieval using the use condition 500, the preliminary retrieval is performed by using the retrieval condition 550, and therefore, it is possible to shorten the time required for the retrieval. Thereby, it is possible to efficiently perform the retrieval.

Next, a second modification of the first embodiment will be described. In the examples described in the first embodiment and the first modification, the user connects the communication terminal 400 to the information retrieval server 300, and inputs the use condition 500 to the communication terminal 400, to perform the retrieval. In an example in the second modification, the user connects the communication terminal 400 to the information retrieval server 300, and performs the retrieval in a state where the user has performed member registration and has logged in to the information retrieval server 300. As described below, after the user performs the member registration, the user can complement the items of the use condition 500 to be input with the communication terminal 400, by using previously-registered user information 900 (FIG. 16). Further, when the user performs the reservation of the vehicle by using the information (the presentation information 1000) relevant to the vehicle that is displayed on the communication terminal 400, if the user has performed the member registration, the user can perform the reservation of the vehicle without inputting user's information necessary for the reservation of the vehicle each time by using the previously-registered user information 900.

When the user performs the member registration in the information retrieval server 300, the information (the user information 900) input at the time of the member registration is stored in the storage unit 320 of the information retrieval server 300. The user logs in to the information retrieval server 300, by using a user ID given when the member registration is performed in the information retrieval server 300.

For example, there can be a case where the user does not input all items of the use condition 500 when the user inputs the use condition 500 with the communication terminal 400 for the retrieval of the vehicle. In such a case, since the number of the items included in the use condition 500 decreases, there is a possibility that the retrieval results include information relevant to a vehicle that does not match a user's latent need.

Hence, in the second modification, in the case where an item of the use condition 500 is lacking and where the lacking item is an item included in the user information 900, the use condition 500 is complemented by using the information of the item of the user information 900. Thereby, even if the item of the use condition 500 is lacking, it is possible to retrieve the vehicle satisfying the complemented use condition. Accordingly, it is possible to present information relevant to a vehicle that matches the user's latent need, to the user.

Next, the user information in the second modification will be described. FIG. 16 is a diagram showing an example of the user information 900 according to the second modification. The user information 900 is stored in the storage unit 320 when the user performs the member registration in the information retrieval server 300. The user information 900 includes information of "user ID", "name", "address", "vehicle type", "price range" and "drop-off request".

The "user ID" is set for the user after the member registration in the information retrieval server 300 is completed, and is used for uniquely identifying the user.

The "name" and the "address" are information indicating the name and address of the user. As an example, other than the information indicating an address registered by the user, the "address" includes information indicating an area that contains the address. In FIG. 16, only the area is shown in the "address".

The "vehicle type" is information indicating a vehicle type with which the complementation is performed when the item "vehicle type" of the use condition 500 is blank. In FIG. 16, for example, in the case of a user with the user ID: 001, "large size" is shown in the "vehicle type". For example, in the case where the user determines the input of the use condition 500 with the communication terminal 400 while the item "vehicle type" is blank, the "vehicle type" is complemented with the information of "large size", if the user has logged in to the information retrieval server 300. In the case where the user inputs information in the item "vehicle type" of the use condition 500, the item "vehicle type" is not complemented. For example, in the case where the user with the user ID: 001 inputs "small size" in the item "vehicle type" of the use condition 500, "small size" is used as the item "vehicle type" of the use condition 500, with no complementation. The technique for the information complementation is similarly applied to the "price range" and "drop-off request" described below.

The "price range" is information indicating a price range with the complementation is performed when the item "price range" of the use condition 500 is blank. In FIG. 16, for example, in the case of the user with the user ID: 001, "V3" is shown in the "price range". For example, in the case where the user determines the input of the use condition 500 with the communication terminal 400 while the item "price range" is blank, the "price range" is complemented with the information of "V3", if the user has logged in to the information retrieval server 300.

The "drop-off request" is information about the drop-off request with which the complementation is performed when the item "drop-off request" of the use condition 500 is blank. In the case where the user hopes that the vehicle allowing the drop-off is displayed as the retrieval result, "request" is registered. In the case where the user hopes that both the vehicle allowing the drop-off and the vehicle not allowing the drop-off are displayed as the retrieval result, "−" is registered. In FIG. 16, for example, in the case of the user with the user ID: 001, "−" is shown in the "drop-off request". For example, in the case where the user determines the input of the use condition 500 with the communication terminal 400 while the item "drop-off request" is blank, the "drop-off request" is complemented with the information of "−", if the user has logged in to the information retrieval server 300.

Figure 17:
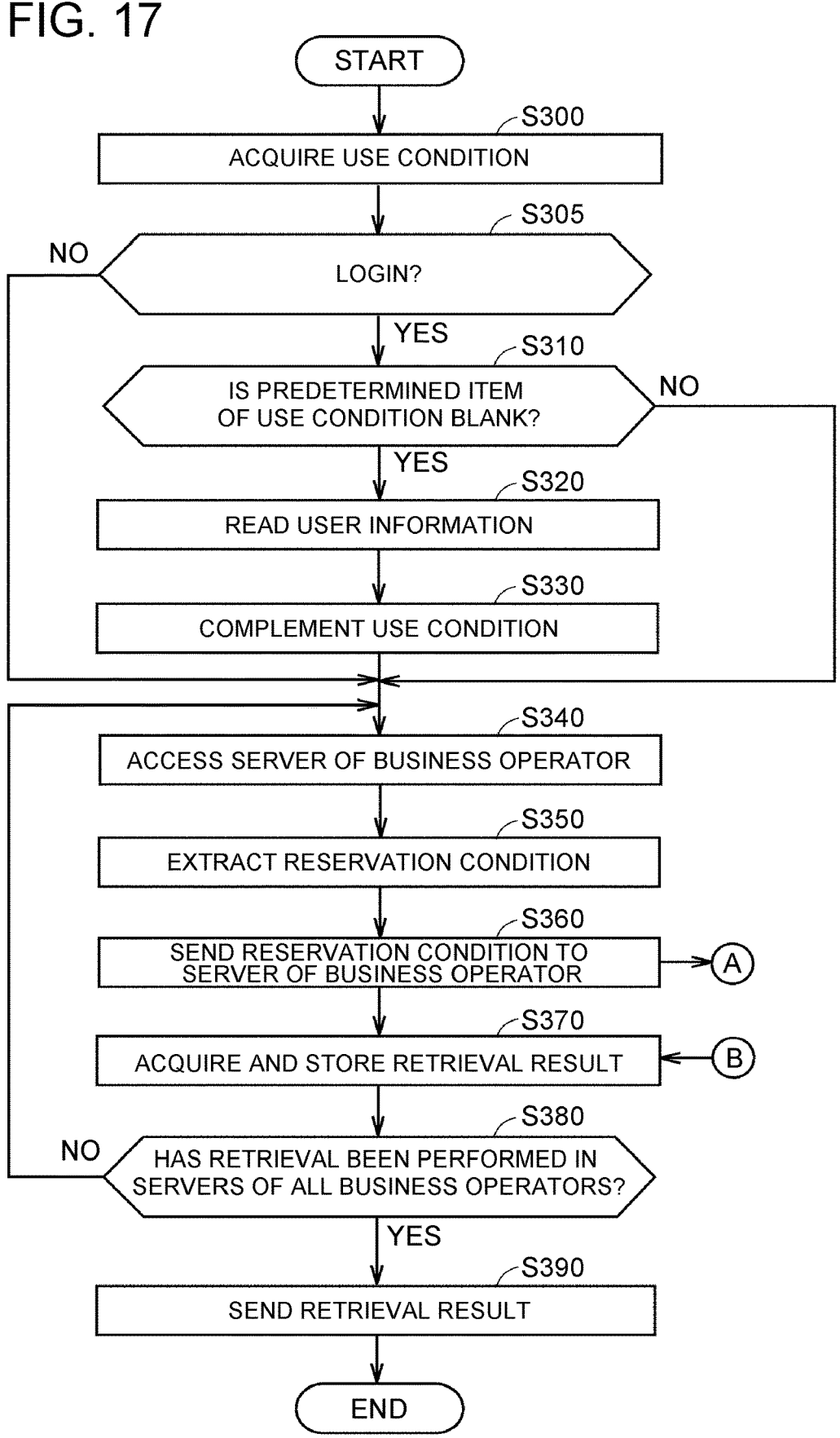
FIG. 17 is a flowchart showing a process in retrieval that is executed by an information retrieval server according to the second modification.

FIG. 17 is a flowchart showing a process in the retrieval that is executed by an information retrieval server 300 according to the second modification. The flowchart shown in FIG. 17 is a flowchart in which S305 to S330 are added to the flowchart shown in FIG. 10. The other steps are the same as the steps in the flowchart shown in FIG. 10, and the repetitive descriptions are omitted. Further, the processes to be executed in the first server 100 and the second server 200 are also the same as the steps in the flowchart shown in FIG. 11, and therefore, repetitive descriptions are omitted.

The control unit 330 acquires the use condition 500 input to the communication terminal 400 by the user, through the communication network 600 (S300).

The control unit 330 determines whether the user has performed the login (S305). When the control unit 330 determines that the user has not performed the login (NO in S305), the control unit 330 transfers the process to S340, and executes the processes of S340 and later.

When the control unit 330 determines whether the user has performed the login (YES in S305), the control unit 330 determines whether a predetermined item of the acquired use condition 500 is blank (S310). The predetermined item is an item that is included in the use condition 500 and that is included in the user information 900. Specifically, for example, the predetermined item includes "vehicle type", "price range" and "drop-off request". The predetermined item is not limited to the above items, and another item can be set as the predetermined item, by changing the items included in the use condition 500 and the items included in the user information 900.

When the control unit 330 determines that the predetermined item of the acquired use condition 500 is blank (YES in S310), the control unit 330 reads the user information 900 using the user ID of the user that is performing the retrieval (the user that has performed the login) (S320).

Using the read user information 900, the control unit 330 complements the predetermined item determined as blank in S310 (S330). Further, the control unit 330 executes the processes of S340 and later, by using the complemented use condition. Then, the control unit 330 sends the information relevant to the vehicle satisfying the complemented use condition, to the communication terminal 400 of the user, as the retrieval result (S390).

When the control unit 330 determines in S310 that the predetermined item of the acquired use condition 500 is not blank (NO in S310), the control unit 330 transfers the process to S340 and executes the processes of S340 and later, without complementing the use condition 500. Then, the control unit 330 sends the information relevant to the vehicle satisfying the use condition 500, to the communication terminal 400 of the user, as the retrieval result (S390).

There is a case where the user hopes to perform the retrieval while the predetermined item of the use condition 500 is intentionally set to blank. In consideration of such a case, a checkbox for avoiding the complementation of the use condition 500 may be provided in the item for inputting the use condition 500 to be displayed on the communication terminal 400. When the checkbox is checked, information indicating that the complementation of the use condition 500 is not performed is added to the use condition 500. In the case where the use condition 500 includes the information indicating that the complementation is not performed, it is possible to avoid the complementation of the use condition 500.

As described above, in the case where the user determines the input of the use condition 500 with the communication terminal 400 without inputting all items of the use condition 500, the number of the items included in the use condition 500 decreases. Therefore, there is a possibility that the retrieval results include the information relevant to the vehicle that does not match the user's latent need.

Even in such a case, if the user has performed the member registration and has logged in to the information retrieval server 300 and the lacking item is an item included in the user information 900, the use condition 500 is complemented by using the information included in the user information 900. Thereby, even if the item of the use condition 500 input by the user is lacking, it is possible to retrieve the vehicle satisfying the complemented use condition. Accordingly, it is possible to present the information relevant to the vehicle that matches the user's latent need.

Next, a second embodiment of the disclosure will be described. In recent years, the field of an artificial intelligence (hereinafter, also referred to as "AI") has rapidly progressed. In an information retrieval system 1B according to the second embodiment, an example in which the use condition 500 is extracted from information input to a communication terminal 400B by using an artificial intelligence will be described. Specifically, an example in which an opened application programming interface (API) relevant to a known artificial intelligence is incorporated in the communication terminal 400B will be described.

Figure 18:
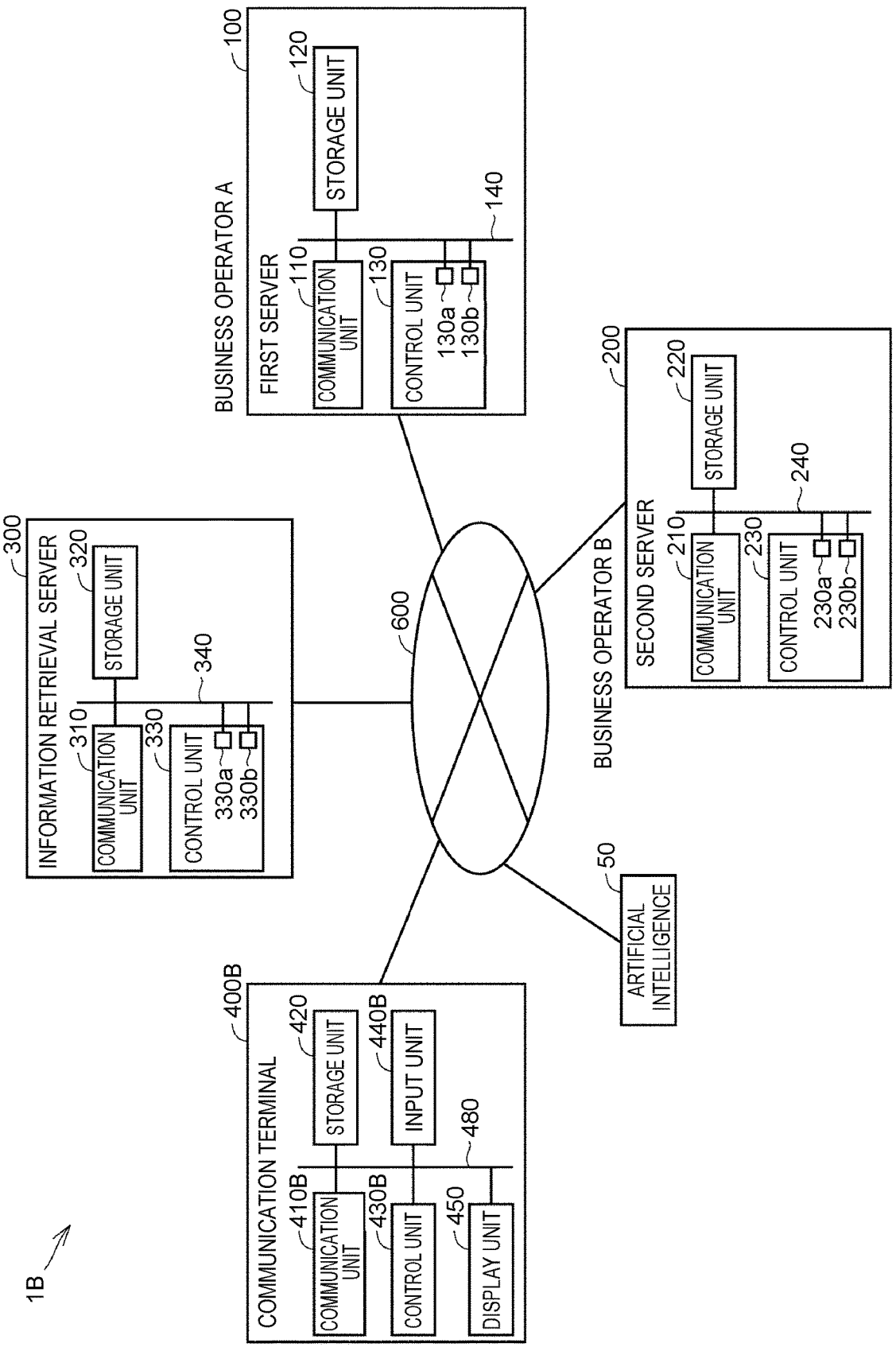
FIG. 18 is a diagram schematically showing an overall configuration of an information retrieval system according to a second embodiment of the disclosure.

FIG. 18 is a diagram schematically showing an overall configuration of the information retrieval system 1B according to the second embodiment. With reference to FIG. 18, the information retrieval system 1B includes the first server 100, the second server 200, the information retrieval server 300, the communication terminal 400B and an artificial intelligence 50. The configuration of the first server 100, the second server 200 and the information retrieval server 300 is the same as the configuration of the information retrieval server 300 in the first embodiment, and therefore, repetitive descriptions are omitted.

The communication terminal 400B includes a communication unit 410B, the storage unit 420, a control unit 430B, an input unit 440B and the display unit 450. The respective units are communicably connected to each other by the communication bus 480. The configurations of the storage unit 420, the display unit 450 and the communication bus 480 are the same as those of the communication terminal 400 according to the first embodiment, and therefore, repetitive descriptions are omitted.

The communication unit 410B is configured to be capable of communicating with the communication unit 110 of the first server 100, the communication unit 210 of the second server 200 and the communication unit 310 of the information retrieval server 300. The communication of the communication unit 410B with the communication unit 110, the communication unit 210 and the communication unit 310 is mutually performed through the communication network 600. Further, the communication unit 410B is configured to be capable of communicating with the artificial intelligence 50 through the communication network 600.

The input unit 440B is a voice input device in which an API for the artificial intelligence 50 is incorporated. The input unit 440B may be configured to allow concurrent use of the voice input device and an input device such as a keyboard, a mouse or a touch panel.

For example, the control unit 430B sends information input to the input unit 440B by voice, as input information, to the artificial intelligence 50 through the communication unit 410.

The artificial intelligence 50 analyzes the input information sent from the communication terminal 400B, and extracts the use condition 500 from the input information. The artificial intelligence 50 and the use method may be based on a known artificial intelligence and the use method.

As a specific example, in the case where "Two persons will go to a supermarket A tomorrow morning" is input by voice to the input unit 440B of the communication terminal 400B, the information input by voice is sent to the artificial intelligence 50 as the input information.

From the received input information, the artificial intelligence 50 extracts information of "tomorrow morning", "supermarket A" and "two persons", as information for extracting the use condition 500. Then, from the information, the artificial intelligence 50 identifies information about the items of "date", "use start hour", "use end hour", "selected area", "vehicle type", "number of riding persons", "price range", "drop-off request" and "option".

Specifically, for example, from the extracted information "tomorrow morning", the artificial intelligence 50 identifies the "date", as information indicating the date of tomorrow. Then, from the information that the destination is the "supermarket A", the artificial intelligence 50 identifies the "use start time", as information indicating 10: 00 that is an opening hour of the supermarket A. Further, in consideration of an average dwell time in supermarkets, the distance from user's home to the supermarket A, and the like, the artificial intelligence 50 identifies the "use end hour", as information indicating 11: 00.

Further, from the information of "two persons", the artificial intelligence 50 identifies the "number of riding persons", as information indicating two persons. From the information that the destination is the "supermarket A", the artificial intelligence 50 identifies the "drop-off request", as blank ("–"), assuming that the user will return to user's home after shopping in the supermarket A.

Further, the artificial intelligence 50 sets blank as the information that cannot be identified from the above input information, specifically, the information of the "selected area", "vehicle type", "price range" and "option", and then, extracts the use condition 500.

The extracted use condition 500 is sent to the information retrieval server 300. Then, for example, the information about the items of the "selected area", "vehicle type", "price range" and "option" is complemented by using the information included in the user information 900.

Figure 19:
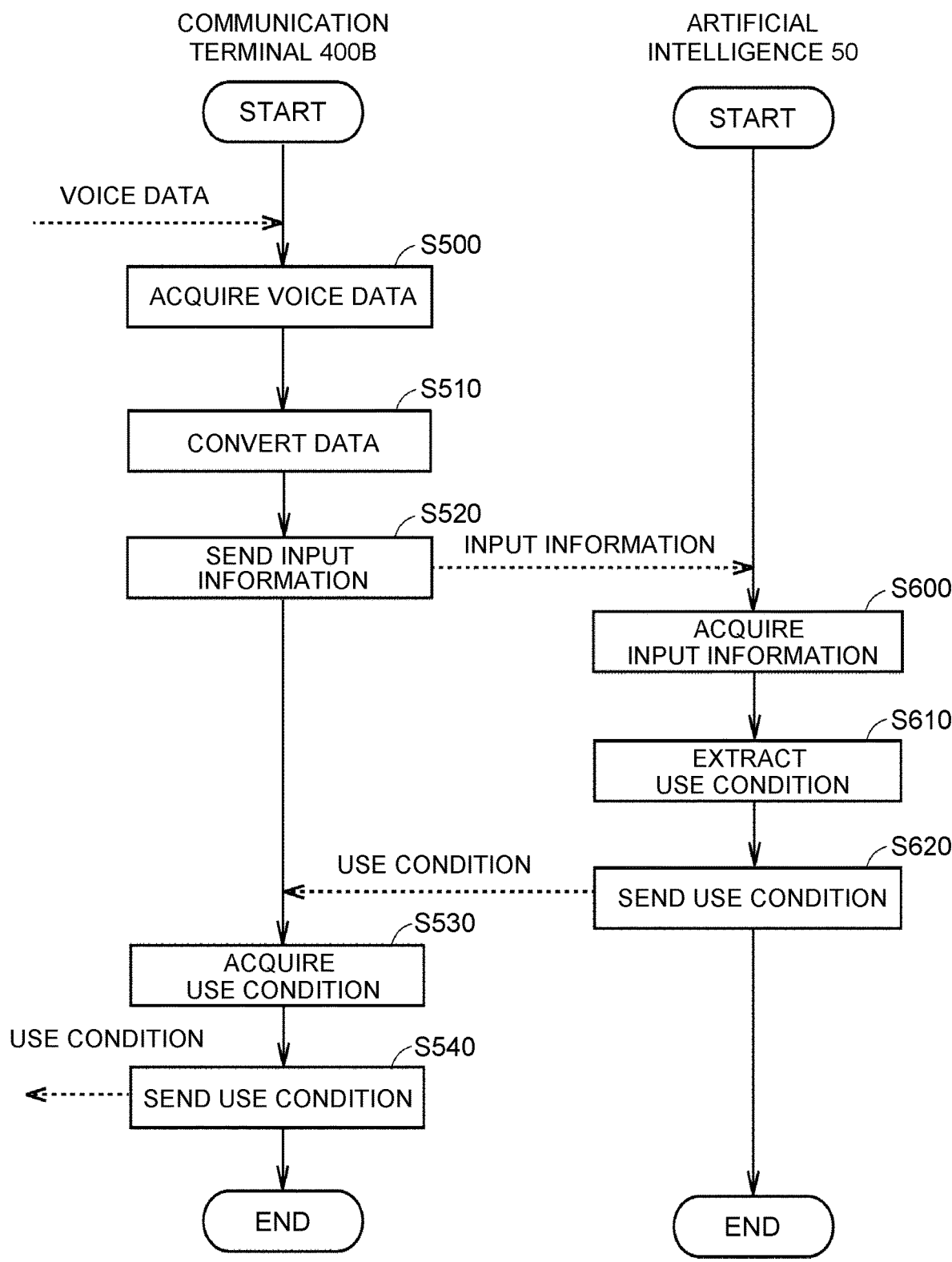
FIG. 19 is a flowchart showing a process that is executed by a communication terminal and an artificial intelligence according to the second embodiment.

FIG. 19 is a flowchart showing a process that is executed by the communication terminal 400B and the artificial intelligence 50 according to the second embodiment. The process in FIG. 19 is executed whenever voice data is input to the 6 communication terminal 4008. In the flowchart shown in FIG. 19, a case where the steps in the communication terminal 400B are realized through software processing by the control unit 430B and input unit 440B of the communication terminal 400B will be described. However, all or some of the steps may be realized by hardware (electric circuit) created in the control unit 430B and the input unit 440B.

When the voice data (analog data) is input to the input unit 440B of the communication terminal 400B (S500), the input unit 440B converts the voice data into the input information (digital data) (S510). After the voice data is converted into the input information, the control unit 430B sends the input information to the artificial intelligence 50 (S520).

The artificial intelligence 50 acquires the input information (S600), and extracts the use condition 500 from the input information (S610). Then, the artificial intelligence 50 sends the extracted use condition 500 to the communication terminal 400B (S620).

The control unit 430B of the communication terminal 400B acquires the use condition 500 (S530), and sends the use condition 500 to the information retrieval server 300 (S540).

The information retrieval server 300 acquires the use condition 500. Similarly to the second modification, if the user has performed the member registration in the information retrieval server 300, the information retrieval server 300 complements the use condition 500 by using the information included in the user information 900. Then, the information retrieval server 300 creates the first and second reservation conditions, and causes the first server 100 and the second server 200 to retrieve the vehicle.

As described above, the API for the artificial intelligence 50 is incorporated in the communication terminal 400B, and thereby, for example, when the user inputs voice data such as a dialogue with the communication terminal 400B, the use condition 500 is extracted from the voice data. Thereby, in the input of the use condition, the user does not need to input the use condition in accordance with a fixed form for the use condition, and can obtain the retrieval result for the vehicle, by giving a user's hope to the communication terminal 400B.

Further, if the user has performed the member registration in the information retrieval server 300, the information retrieval server 300 complements the use condition 500 by using the information included in the user information 900. Thereby, retrieval accuracy is improved, and convenience for the user is further improved.

It should be understood that the embodiments disclosed herein is examples and are not limiting in all respects. It is intended that the scope of the disclosure is shown by not the above descriptions of the embodiments but the claims, and includes all modifications in a meaning and scope equivalent to the claims.

What is claimed is:

1. An information retrieval server comprising:
a communication device configured to communicate with servers of a plurality of business operators and a communication terminal of a user through a communication network, each of the plurality of business operators performing a car sharing service; and
a processing device configured to present information relevant to vehicles held by the plurality of business operators to the user, the processing device being configured to,
acquire information input from the communication terminal, the information being information about a predetermined item included in a use condition for the car sharing service,
cause the communication device to transmit the acquired information to the servers of each of the plurality of business operators;
cause the servers of the plurality of business operators to retrieve a vehicle from the held vehicles, the vehicle satisfying a use condition determined by the acquired information, and
send information relevant to the retrieved vehicle to the communication terminal.

2. The information retrieval server according to claim 1 further comprising a storage device configured to store business information of the plurality of business operators, wherein the processing device is configured to:
extract a previously-determined item included in the use condition, as a retrieval condition;
retrieve a business operator having business information from the business information of the plurality of business operator stored in the storage device, the business information satisfying the retrieval condition; and
cause the server of the retrieved business operator to retrieve the vehicle from vehicles held by the retrieved business operator.

3. The information retrieval server according to claim 2, wherein:
the storage device is configured to further store user information;
the processing device is configured to complement the use condition by using information included in the user information, when information about at least one predetermined item included in the use condition is not input and the item about which the information is not input is included in the user information; and
the processing device is configured to cause the server of the retrieved business operator to retrieve the vehicle by using the complemented use condition.

4. The information retrieval server according to claim 2, wherein:
the storage device is configured to record information input by the user at a time of member registration of the user; and
the processing device is configured to retrieve the vehicle in a state where the user has logged in to the information retrieval server.

5. The information retrieval server according to claim 1, wherein processing device is configured to input the use condition by voice.

6. The information retrieval server according to claim 1, wherein the processing device is configured to cause the servers of the plurality of business operators to perform an advance preliminary retrieval, and then, cause the servers of the plurality of business operators to retrieve the vehicle from the held vehicles, the vehicle satisfying the use condition determined by the acquired information.

7. An information retrieval system by comprising:
servers of a plurality of business operators, each of the servers being configured to perform a car sharing service;
a communication terminal of a user, the communication terminal being configured to use the car sharing service; and
an information retrieval server configured to communicate with the servers of the plurality of business operators and the communication terminal through a communication network, and configured to present information relevant to vehicles held by the plurality of business operators to the user,
wherein the communication terminal is configured to send information input by the user, to the information retrieval server, the information being information about a predetermined item included in a use condition,
wherein the information retrieval server is configured to transmit the information about the predetermined item to the servers of each of the plurality of business operators and cause the servers of the plurality of business operators to retrieve a vehicle from the held vehicles, the vehicle satisfying the use condition determined by the information acquired from the communication terminal, and
wherein the information retrieval server is configured to send information relevant to the retrieved vehicle to the communication terminal.

8. The information retrieval server according to claim 7, wherein:

the communication terminal includes an artificial intelligence configured to extract the use condition from information input by voice from the user;

the information retrieval server is configured to store user information;

the information retrieval server is configured to complement the use condition by using information included in the user information, when information about at least one predetermined item included in the use condition is not extracted by the artificial intelligence and the item about which the information is not extracted is included in the user information; and the information retrieval server is configured to cause the servers of the plurality of business operators to retrieve the vehicle by using the complemented use condition.

9. An information retrieval method for communicating with servers of a plurality of business operators and a communication terminal of a user through a communication network, each of the plurality of business operators performing a car sharing service, and presenting information relevant to vehicles held by the plurality of business operators to the user, the information retrieval method comprising:

acquiring information input from the communication terminal, the information being information about a predetermined item included in a use condition for the car sharing service;

transmitting the acquired information to the servers of each of the plurality of business operators;

causing the servers of the plurality of business operators to retrieve a vehicle from the held vehicles, the vehicle satisfying a use condition determined by the acquired information; and sending information relevant to the retrieved vehicle to the communication terminal.

* * * * *